United States Patent Office 3,469,450
Patented Sept. 30, 1969

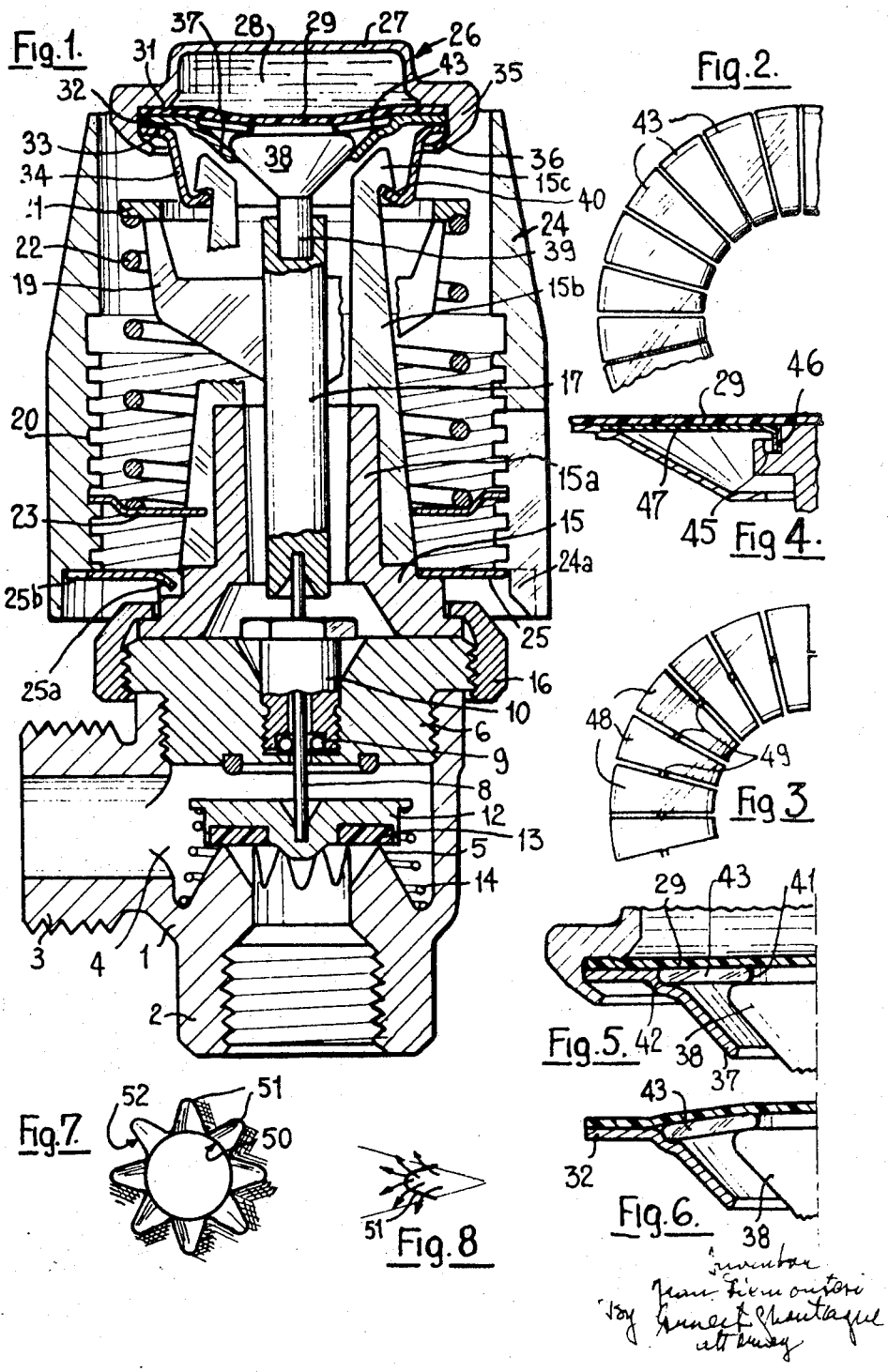

3,469,450
THERMOSTATIC DEVICES
Jean Piemontesi, Plan-les-Ouates, Switzerland, assignor to Kugler Fonderie et Rolinetterie S.A., Geneva, Switzerland, a corporation of Switzerland
Filed Apr. 15, 1968, Ser. No. 721,342
Claims priority, application Switzerland, Apr. 17, 1967, 5,394/67
Int. Cl. G05d 23/02; F16k 1/42
U.S. Cl. 73—368.3                    3 Claims

ABSTRACT OF THE DISCLOSURE

A thermostatic valve comprises a chamber filled with a volatile liquid and having a flexible diaphragm extending across an aperture formed in one wall thereof. An actuating member for a valve bears on a central part of the diaphragm and the space between the actuating member and the chamber wall is bridged by a plurality of rigid segments which support the diaphragm while allowing it to flex freely. The chamber is provided in a cap which is supported by three horns of insulating material extending from the valve body so that the cap is thermally insulated from liquid passing through the valve.

---

This invention relates to thermostatic devices in which the position of an actuating member controlling a valve, switch or the like is controlled by the movement of a deformable member forming part of a wall of a closed chamber filled with a volatile liquid, in response to changes of the vapour pressure of the liquid with temperature.

In prior art thermostatic devices of the above kind, the deformable member is a metal tube which is inconveniently large, relatively rigid, and the welded portions thereof may break in contact with corrosive substances.

In other prior art devices of the above kind the deformable member comprises a flexible diaphragm extending across an opening in one wall of the chamber. However, the last-mentioned arrangement is not current practice, since there are few sufficiently flexible diaphragms completely impermeable to the control liquids used, e.g. Freon. To prevent the diaphragm from offering excessive resistance to the movement of the actuating member, the space, across which the diaphragm extends, between the actuating member and the edge of the opening in the wall of the chamber must have a considerable radial width. However, local deformations of the diaphragm, particularly at its edges, are in that case considerable if the pressure in the chamber is high. Such considerable deformations often lead to losses in the sealing-properties of the diaphragm. Such losses are impermissible with small capacity control caps, even if they are very low. This has the disadvantage of preventing the use of some rubber diaphragms which have a surface coating giving them very satisfactory sealing-tightness, but which cannot stand up to considerable deformation.

It is an object of the invention to provide a thermostatic device of the above kind in which the diaphragm is supported so as to prevent extreme local deformation while still retaining its flexibility.

It is another object of the present invention to provide a thermostatic device comprising a closed chamber filled with a volatile liquid, one wall of the chamber being formed with an aperture across which extends a flexible diaphragm, and an actuating member engaging a central portion of the diaphragm so as to be movable by vapour pressure variations in the chamber, the diaphragm being supported in the space between the actuating member and the wall of the chamber by a series of closely adjacent supporting elements extending between the actuating element and the wall of the chamber and which bear at opposite ends against the actuating member and a supporting rim formed on a member fixed to the chamber wall and arranged closely adjacent the edge of the aperture, the supporting elements cooperating to form a substantially continuous supporting surface for the diaphragm.

With the above and other objects in view which will become apparent in the following detailed description, the present invention will be clearly understood in connection with the accompanying drawing, in which:

FIG. 1 is an axial section through the valve;

FIG. 2 is a view, to an enlarged scale, of some of the supporting elements supporting the diaphragm of the valve shown in FIG. 1;

FIG. 3 is a view similar to FIG. 2, showing a variant of the diaphragm supporting elements;

FIG. 4 is a partial view of a variant of the valve, showing another variant of the supporting elements;

FIGS. 5 and 6 are partial views of the valve, showing the diaphragm and its supporting elements in different operational positions, to a larger scale than in FIG. 1;

FIG. 7 is a plan view of a valve seat; and

FIG. 8 is a partial view of the seat.

The thermostatic valve illustrated comprises a body 1 having an inlet 2 and an outlet 3 communicating with a chamber 4. A valve seat 5 is formed within the chamber 4 around the inlet 2. Above the valve seat 5 the chamber 4 is closed by a screwed cover or lid 6 formed with an axial aperture through which a rod 8 extends which is adapted to slide axially in a ball guiding device 9 disposed in a plug 10. The plug 10 also comprises sealing means (not shown) which ensures a fluid tight seal between the rod 8 and the plug 10, without preventing the axial displacement of the rod 8.

The bottom end of the rod 8 engages in a central recess in the top of a valve member 12 which has a rubber lining 13 on its underface to cooperate with the seat 5 as shown in FIG. 1. A helical spring 14 tending to raise the valve member 12 keeps the latter bearing against the bottom end of the rod 8.

A plastic base 15 is attached by a screwthreaded return ring 16 to the upper surface of the lid 6. The base 15 comprises a cylindrical base portion 15a and three horns 15b disposed at 120° intervals about the axis of the base portion 15a extending upwardly paraxially with the base portion 15a. Disposed in an axial bore in the base 15 and in the space between the three horns 15b is a push rod 17, the lower end of which is formed with a recess in which the top end of the rod 8 engages. The push rod 17 is integral wth three radial arms 19 extending between the horns 15b and supporting an annular clevis 21 acting as a support for the upper end of a spring 22 axially compressed between the clevis 21 and a supporting plate 23 whose position is vertically adjustable. The plate 23 is formed with a central aperture comprising three radial slots in which the horns 15b engage, so that the plate 23 is prevented from rotating in relation to the base 15. The periphery of the plate 23 has three projecting teeth distributed at an angle of 120° and engaging in the internal triple screwthread 20 of a rotating control knob 24 which rests axially on a stop plate 25 bearing against the base 15. The plate 25 is prevented from rotating by a tongue 25a which engages in a notch in the base 15. The periphery of the stop plate 25 is formed with a tooth 25b, and the knob 24 comprises an internal stop 24a which abuts the tooth 25b and limits the rotation of the knob to one turn. The stop 24a is disposed on a narrow segment of the knob bounded between two radial slots machined in the knob. The lower portion of the segment can be moved away radially, to allow the stop to pass from one side to the other of the tooth 25b when the valve is assembled.

The valve is controlled in accordance with the temperature of the ambient air by an expansible control cap 26. The cap 26 is formed by a metal casing 27 of generally part-spherical shape and provides a shallow cylindrical chamber 28 filled with a suitable volatile liquid, for instance, freon. A circular diaphragm 29, made, for instance, of synthetic rubber extends across the chamber 28, the periphery of the diaphragm being gripped between an annular rib 31 of the casing 27 and the periphery of a metal washer 32. The periphery of the washer 32 bears against a circular external flange 33 of a metal collar 34, and the casing has a side wall 35 comprising a flange 36 which is crimped downwardly onto the flange 33 of the collar 34 to ensure that the chamber 88 is 33 of the collar 34 to ensure that the chamber 88 is completely sealed. The washer 32 is formed with a central aperture disposed at the end of a hollow boss 37 receiving the conical head of a piston 38 at the upper end of the push rod 17. The piston 38 acts as a support for the central portion of the diaphragm 29, and the external diameter of the piston is larger than the diameter of the aperture in the washer 32, so that the piston abuts the boss 37 of the washer when the diaphragm is in its furthest extended position (FIG. 1). The lower portion of the collar 34 is formed with an internal circular edge 40 engaging hooks 15c with which the ends of the three horns 15b are formed. The horns 15b are slightly deformable, and during assembly the collar 34 is pushed over the ends of the horns which thus provide snap engagement means for attaching the cap to the base.

The piston 38 comprises a rod 39 engaging in a recess with which the push rod 17 is formed. The head of the piston 38 comprises a peripheral groove 41 (FIGS. 5 and 6), while the washer 32 is formed with a supporting rim provided with a slight annular groove 42 at the base of the boss 37. The two grooves 41, 42 form recesses receiving the internal and external edges of a series of twenty four supporting elements 43 forming a bridge between the fixed washer 32 and the piston 38 acting as a support for the diaphragm 29. The supporting elements 43 (see FIGURE 2), each have two radially extending sides adjacent adjoining supporting elements and radially opposite ends formed by arcs of concentric circles. Their ends are rounded in section as shown in FIGURES 5 and 6. The elements 43 cooperate to form a substantially continuous supporting surface for the diaphragm 29, which supporting surface is sufficiently flexible to allow the piston 38 a limited movement.

In FIGURE 1, the piston 38 is shown in its lowermost position in which the series of elements 43 and the diaphragm 29 define an upwardly concave surface. In FIG. 5, the piston 38 is shown in an intermediate position, in which the elements 43 and the diaphragm 29 are flat. In FIG. 6, the piston 38 is shown in a raised position, in which the elements 43 and the diaphragm 29 define a downwardly concave surface.

The supporting elements 43 offer substantially no extra resistance to piston movement, although they ensure a very extensive support for the diaphragm, 29 and allow it to operate without considerable local deformations, even at elevated pressures. The diaphragm 29 can be very thin, made of rubber, plastics, or even of a metal, impervious ribbon, etc. It can also have a coating giving it improved sealing properties, even if the coating is relatively fragile and will not stand up to considerable local deformations.

In the variant shown in FIG. 3, the supporting elements 48 are interconnected by flexible central tongues 49. In the variant shown in FIG. 4, the head 38 is formed with an annular groove 45 in which a bent edge 46 of the supporting elements 47 engages. In this variant the supporting elements 47 are made of sheet metal having a thickness of 0.3 mm. The groove 45 facilitates the assembly of the elements 47 which have in plan the same general shape as the elements 43.

The supporting elements can be made of any material, for instance, press-cut sheet metal, or injection moulded plastics. No disadvantage is caused if the tongues connecting the adjacent sectors are broken during usage. The tongues can therefore be very fine. The supporting elements thus form below the diaphragm a deformable supporting bridge without any resilience of its own.

The seat 5 comprises 8 radial furrows or serrations 51 (FIG. 7), disposed in the shape of a star around the bore 50 of the inlet 2. The serrations are of progressively decreasing depth, so that the variable flow section of the valve is determined between the flat surface of the lining 13 and a sinuous sloping edge 52 (FIG. 7). The sinuous shape enables a greater length of the edge to be obtained for a given projected surface of the valve. In this way, while the valve seat has a very long edge to limit the extent to which the valve member 12 must be raised to allow a given flow of fluid through the valve, the area of the valve member on which the pressure in the inlet 2 acts is relatively small. Each furrow 51 in the seat is so shaped as to produce a regular flow, as shown in FIG. 8.

In variants, the seat could have other shapes of considerable periphery for a small projected surface (e.g. square, rectangular, or cruciform etc.).

The thermostatic valve illustrated operates as follows: By turning the calibrated knob 24, the pressure exerted upwardly on the push rod 17 by the spring 22 can be regulated. The effect of this upward pressure is to tend to move the valve member 12 away from the valve seat 5. Heating fluid entering the body 1 via the inlet 2 can then flow towards the outlet 3. When the cap 26 reaches the regulating temperature corresponding to the given position of the knob 24, the vapour pressure within the cap 26 urges the push rod 17 against the force of the spring 14, to close the valve 12 and thus interrupt the flow of heating fluid.

The following features contribute to the sensitivity of the valve.

The control cap 26 is satisfactorily thermally-insulated from the valve body, so that its operation is independent of the temperature thereof, the control cap 26 has a large heat exchange surface in contact with the ambient air and small thermal mass so that its thermal inertia is low, the opposing spring 22 is of large diameter, so that its characteristic can be more favourable, and the ratio between the length of the sloping edge of the valve seat 5 and the projected surface of the seat is large, so that the valve is less sensitive to variations in the pressure of the heating fluid.

The control cap 26 is formed by inexpensive members whose crimping assembly requires no welding operations. The diaphragm is therefore not heated during assembly. The diaphragm is flat and can therefore be cut out of a sheet of material. Since it is supported over its entire surface it can be thin, even if the cap operates at elevated pressures. Since no extreme local deformation occurs, the diaphragm can readily be given a relatively fragile coating to provide an improved fluid-tight seal.

The thermostatic control device of the valve comprises a small number of members, and once the collar 34 of the cap has been attached to the horns of the base 15, all the members are retained in position merely by the pressure exerted by the spring 22, without the use of any screws or other assembly members. For dismantling, it is sufficient to remove the knob 24 and then bring the horns 15b together by means of special tongs, to enable the control cap 26 to be detached.

While I have disclosed several embodiments of the present invention, it is to be understood that these embodiments are given by example only and not in a limiting sense.

I claim:
1. A thermostatic device comprising
a casing including a control cap partially enclosing a chamber filled with a volatile liquid,
said casing adjacent said chamber including a wall formed with an aperture,
a flexibe diaphragm extending across said aperture in said wall of said chamber,
an actuating member engaging a central portion of said diaphragm and movable by vapour pressure variations in said chamber,
a first member operatively fixed to said wall of said chamber and having a supporting rim arranged closely adjacent the edge of said aperture,
a series of closely adjacent supporting elements extending between said actuating member and said wall of said chamber and supporting said diaphragm and bearing at opposite ends on said actuating member and said supporting rim,
said supporting elements cooperating to form a substantially continuous supporting surface for said diaphragm,
    a fixed support,
    said control cap operatively carried by said fixed support,
    said actuating member including a push rod at one end and extending normally therefrom,
    adjustment means comprising,
    a stop plate bearing on said fixed support,
    a hollow control knob encircling said push rod and co-axial therewith and bearing on said stop plate,
    said hollow control knob formed with an internal screw thread,
    a supporting plate supported at its outer periphery by said internal screw thread and mounted non-rotatably about and axially to said push rod,
    a clevis integral with said push rod, and a helical spring disposed around said push rod and within said hollow control knob between said clevis and said supporting plate to urge said push rod towards said chamber.

2. The device, as set forth in claim 1, wherein said fixed support includes,
a base,
a plurality of horns extending from said base paraxially of said push rod and spaced at equal angles thereabout, and
means, at the ends of said horns remote from said base, for operatively supporting said control cap.

3. The device as set forth in claim 2, wherein
said means at said ends of said horns comprise snap engagement means, and
engagement means complementary to said snap engagement means are operatively formed on said control cap.

References Cited
UNITED STATES PATENTS

| | | |
|---|---|---|
| 655,361 | 8/1900 | Cash. |
| 721,324 | 2/1903 | Rayner. |
| 1,305,603 | 6/1919 | Hodgson. |
| 1,555,592 | 9/1925 | Lawler _____ 236—42 |
| 2,387,793 | 10/1945 | Holmes _____ 236—99 |
| 3,067,944 | 12/1962 | Meier _____ 236—42 |

EDWARD J. MICHAEL, Primary Examiner

U.S. Cl. X.R.

236—99